United States Patent

Yamada et al.

[11] Patent Number: 6,051,665
[45] Date of Patent: Apr. 18, 2000

[54] COATING COMPOSITION

[75] Inventors: Kinji Yamada; Hozumi Sato; Yuichi Hashiguchi; Akira Nishikawa, all of Tsukuba; Naoki Sugiyama, Tsuchiura, all of Japan

[73] Assignee: JSR Corporation, Tokyo, Japan

[21] Appl. No.: 09/081,284

[22] Filed: May 20, 1998

[51] Int. Cl.[7] .......................... C08F 283/12; C08G 77/38; C08G 77/14; C08L 83/04; C08L 83/06
[52] U.S. Cl. .......................... 525/477; 525/475; 525/539
[58] Field of Search ........................ 525/475, 477, 525/539, 540, 389

[56] References Cited

U.S. PATENT DOCUMENTS

| | | | |
|---|---|---|---|
| 4,751,114 | 6/1988 | Homma et al. | 427/407.1 |
| 4,923,945 | 5/1990 | Isozaki et al. | 528/16 |
| 5,306,759 | 4/1994 | Sakagami et al. | . |
| 5,387,646 | 2/1995 | Nakahata et al. | 525/103 |
| 5,492,968 | 2/1996 | Nakai et al. | 525/101 |
| 5,525,673 | 6/1996 | Nakahata et al. | 525/104 |
| 5,532,304 | 7/1996 | Miyazaki et al. | 524/261 |
| 5,804,674 | 9/1998 | Yamana et al. | 525/477 |
| 5,855,960 | 1/1999 | Ohnishi et al. | 427/337 |
| 5,880,227 | 3/1999 | Kobayashi et al. | 525/477 |
| 5,880,234 | 3/1999 | Maeda et al. | 526/244 |

FOREIGN PATENT DOCUMENTS 03033148  2/1991  Japan .

*Primary Examiner*—Vasu Jagannathan
*Assistant Examiner*—Carrie E. Shosho
*Attorney, Agent, or Firm*—Oblon, Spivak, McClelland, Maier & Neustadt, P.C.

[57] ABSTRACT

A coating composition comprising (A) a fluorine-containing polymer, (B) a compound represented by the following general formula (1) or a partial condensation product thereof, $$SiR^1_n(OR^2)_{4-n} \qquad (1)$$

wherein $R^1$ represents an alkyl group, an aryl group, an aralkyl group, a group containing —SH, or a group containing —NCO, each containing 1 to 10 carbon atoms, $R^2$ represents a hydrogen atom, an alkyl group or acyl group having 1 to 10 carbon atoms, and n is an integer from 0 to 3, and (C) a chelate complex derived from a metal alkoxide. The coating composition can efficiently form a transparent cured coating exhibiting superior adhesion to various substrates, excellent scratch resistance, excellent weatherability, and having a low refractive index.

8 Claims, No Drawings

COATING COMPOSITION

BACKGROUND OF THE INVENTION

1. Field of the Invention

The present invention relates to a coating composition, and more particularly, to a coating composition capable of efficiently forming a transparent cured coating exhibiting superior adhesion to various substrates, excellent scratch resistance, excellent weatherability, and having a low refractive index and to a coating made from the composition.

2. Description of the Background Art

Various characteristics such as adhesion to a substrate, scratch resistance, weatherability, and low refractive index are required for polymer coatings such as exterior paint coatings, hard coatings, desiccating coatings, and antireflection coatings.

In recent years, a polymer containing a fluorine atom has been attracting interest in various fields such as exterior paints for constructions, since such a polymer exhibits superior weatherability and the like. Moreover, a method for preparing a polymer exhibiting a low refractive index by increasing the fluorine content of such a polymer has been studied.

However, a polymer containing a fluorine atom differs from other organic materials in its solubility parameter and small intermolecular cohesive force. Therefore, solvents used for preparing the polymer materials are limited. In addition, such a polymer exhibits low adhesion to a substrate, inferior hardness, and insufficient transparency when coated on the surface of a substrate.

In order to solve the above problems, the following methods have been proposed:

(1) A method for preparing a fluorine-containing polymer exhibiting superior adhesion by copolymerization of a fluoroolefin, vinyl ether, and vinyl alkoxysilane (see, Japanese Patent Application Laid-open No. 258852/1986).

(2) A method for preparing a composition exhibiting superior weatherability and curability by reacting a fluoroolefin copolymer having an amino group and a carboxyl group with an epoxy functional alkoxysilane and a silanol group containing compound (see, Japanese Patent Application Laid-open No. 185740/1987).

(3) A method for preparing a top coat for automobiles having superior weatherability, scratch resistance, and acid resistance by reacting a fluorine-containing polymer having a hydroxyl group and a carboxyl group with a hydrolytic condensation product of metal alkoxide (see, Japanese Patent Application Laid-open No. 275379/1992).

(4) A method for preparing an antireflection product from hydrolyzate of fluorine alkoxysilane (see, Japanese Patent Application Laid-open No.40845/1986 and No.1527/1989).

(5) A method for using a composition prepared by dissolving a polymer having a fluorine-containing alicyclic structure in a solvent as a low reflection processing agent (see, Japanese Patent Application Laid-open No.19801/1990).

However, the methods disclosed in Japanese Patent Applications Laid-open No.258852/1986, No.185740/1987, and No.1527/1989 are insufficient from the viewpoint of the production efficiency, because the coatings formed must be dried for a long period.

In addition, since the coatings must be dried at a high temperature in the methods disclosed in Japanese Patent Applications Laid-open No.40845/1986 and No.275379/1992, the substrates to which the coatings can be applied are limited.

In the methods disclosed in Japanese Patent Application Laid-open No.19801/1990, solvents used in the composition are limited and the coating formed from the composition exhibits insufficient scratch resistance.

As described above, no coating composition for efficiently forming a cured coating exhibiting superior properties such as superior adhesion to a substrate, excellent scratch resistance, superior weatherability, low refractive index, and excellent transparency has been conventionally known.

The present invention has been achieved in view of this situation.

An object of the present invention is to provide a coating composition for efficiently forming a transparent cured coating exhibiting extreme adhesion to various substrates such as glass, ceramic, metal, and plastics.

A second object of the present invention is to provide a coating composition for efficiently forming a transparent cured coating exhibiting high hardness and superior scratch resistance.

A third object of the present invention is to provide a a coating composition for efficiently forming a transparent cured coating exhibiting superior weatherability.

A fourth object of the present invention is to provide a coating composition for efficiently forming a transparent cured coating exhibiting a low refractive index.

A fifth object of the present invention is to provide a coating composition for efficiently forming a transparent cured coating useful as an antireflection film.

SUMMARY OF THE INVENTION

The above objects can be solved in the present invention by a coating composition comprising:

(A) a fluorine-containing polymer, (B) a compound represented by the following general formula (1) or a partial condensation product thereof, $$SiR^1_n(OR^2)_{4-n} \quad (1)$$

wherein $R^1$ represents an alkyl group, an aryl group, an aralkyl group, a group containing —SH, or a group containing —NCO, each containing 1 to 10 carbon atoms, $R^2$ represents a hydrogen atom, an alkyl group or acyl group having 1 to 10 carbon atoms, and n is an integer from 0 to 3, provided that when two or more groups represented by $R^1$ and $R^2$ are present, these groups may be either the same or different and at least one group represented by $R^2$ must be an alkyl group or acyl group, and (C) a chelate complex derived from a metal alkoxide.

Other and further objects, features and advantages of the present invention will appear more fully from the following description.

DETAILED DESCRIPTION OF THE INVENTION AND PREFERRED EMBODIMENTS

Component (A)

The component (A) in the present invention is a fluorine-containing polymer. The fluorine-containing polymer of the present invention is obtained by the polymerization of a monomer or a mixture of monomers in which a fluorine-containing monomer such as fluoroolefins, fluorine-containing vinyl ethers such as perfluoro(alkyl vinyl ether), perfluoro(alkoxyalkyl vinyl ether), (fluoroalkyl) vinyl ether, (fluoroalkoxyalkyl) vinyl ether, or a fluorine-containing (meth)acrylate is a major component.

In the present invention, it is preferable that the fluorine-containing polymer have a reactive group or a siloxane structure.

Examples of the reactive group of the fluorine-containing polymer include a hydrolyzable silyl group, epoxy group, hydroxyl group, carboxyl group, amino group, and the like.

Preparation of Fluorine-containing Polymer Having Reactive Group

As a method for preparing the fluorine-containing polymer having reactive groups, for example, a method for obtaining a fluorine-containing copolymer having a reactive group (hereinafter called "reactive fluorine-containing copolymer") by the polymerization of a monomer mixture comprising a fluorine-containing monomer, a monomer having reactive groups selected from a hydroxyl group, epoxy group, amino group, and carboxyl group (hereinafter called "reactive group-containing monomer"), and a monomer which is copolymerizable with these monomers (hereinafter called "copolymerizable monomer ①") is given.

Moreover, a hydrolyzable silyl group can be introduced by a method of silane-modification (hereinafter called "silane modification method") by reacting the resulting reactive fluorine-containing copolymer with a silane compound having a functional group capable of reacting with the above reactive groups (hereinafter called "reactive silane compound").

(1) Fluorine-containing Monomer

As examples of the fluorine-containing monomer used in the above preparation, the following compounds are given: fluoroolefins such as vinyl fluoride, vinylidene fluoride, trifluoroethylene, tetrafluoroethylene, chlorotrifluoroethylene, bromotrifluoroethylene, pentafluoropropylene, and hexafluoropropylene; perfluoro (alkyl vinyl ether) or perfluoro(alkoxyalkyl vinyl ether) such as perfluoro (methyl vinyl ether), perfluoro (ethyl vinyl ether), perfluoro (propyl vinyl ether), perfluoro (butyl vinyl ether), perfluoro(isobutyl vinyl ether), and perfluoro (propoxypropyl vinyl ether); (fluoroalkyl) vinyl ethers or (fluoroalkoxyalkyl) vinyl ethers represented by the general formula "$CH_2=CH-O-R_f$" (wherein $R_f$ is a fluorine atom-containing alkyl group or alkoxyalkyl group ); fluorine-containing (meth)acrylates such as 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl) ethyl (meth)acrylate, and 2-(perfluorodecyl)ethyl (meth) acrylate. These fluorine-containing monomers may be used either individually or in combinations of two or more. Of these fluorine-containing monomers, fluoroolefins such as trifluoroethylene, tetrafluoroethylene, pentafluoropropylene, and hexafluoropropylene, (fluoroalkyl)vinyl ethers, and (fluoroalkoxyalkyl)vinyl ethers are preferable, and hexafluoropropylene is particularly preferable.

(2) Reactive Group-containing Monomer

The reactive group-containing monomer in the above preparation method is used for introducing reactive groups to the resulting reactive fluorine-containing copolymer. Specific examples of such a monomer include a hydroxyl group-containing monomer, epoxy group-containing monomer, amino group-containing monomer, and carboxyl group-containing monomer.

As specific examples of the hydroxyl group-containing monomer, hydroxyl group-containing vinyl ethers such as 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 5-hydroxypentyl vinyl ether, and 6-hydroxyhexyl vinyl ether, hydroxyl group-containing allyl ethers such as 2-hydroxyethylallyl ether, 4-hydroxybutylallyl ether, and glycerolmonoallyl ether, allyl alcohol, and the like can be given.

Specific examples of the epoxy group-containing monomer include vinyl glycidyl ether, allyl glycidyl ether, 3-glycidyloxy vinyl dimethoxysilane, 3-glycidyloxy vinyl diethoxysilane, glycidyl crotonate, glycidyl (meth) acrylate, and the like.

Specific examples of the amino group-containing monomer include diethylaminopropyl (meth)acrylate, dimethylaminopropyl (meth)acrylate, acrylamide, vinylpyridine, vinylcaprolactam, and the like.

Specific examples of carboxyl group-containing monomer include unsaturated carboxylic acids such as crotonic acid, itaconic acid, and (meth) acrylic acid; polyvalent carboxylic acid vinyl esters such as vinyl fumarate, vinyl maleate, vinyl succinate, and vinyl phthalate; polyvalent unsaturated carboxylic acid monoesters such as methyl fumarate and ethyl maleate; and the like.

These reactive group-containing monomers may be used either individually or in combinations of two or more. Monomers having either the same or different reactive groups may be used in combination.

(3) Copolymerizable Monomer ①

As specific examples of the copolymerizable monomer ① used in the above preparation method, alkyl vinyl ethers or cycloalkyl vinyl ethers such as methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, 2-ethylhexyl vinyl ether, and cyclohexyl vinyl ether; carboxylic acid vinyl esters such as vinyl acetate, vinyl propionate, vinyl butyrate, vinyl pivalate, vinyl caproate, vinyl versatate, and vinyl stearate; α-olefins such as ethylene, propylene, and isobutene; and (meth)acrylates such as methyl (meth)acrylate, ethyl (meth) acrylate, n-butyl (meth)acrylate, isobutyl (meth) acrylate, 2-methoxyethyl (meth) acrylate, 2-ethoxyethyl (meth) acrylate, and 2-(n-propoxy) ethyl (meth) acrylate, can be given. These copolymerizable monomers ① may be used either individually or in combinations of two or more.

Of these copolymerizable monomers, from the viewpoint of increasing the yield of the resulting reactive fluorine-containing copolymers, alkyl vinyl ethers, cycloalkyl vinyl ethers, and carboxylic acid vinyl esters can be preferably used.

Moreover, from the viewpoint of increasing the flurorine content in the resulting reactive fluorine-containing copolymer, low molecular weight monomers such as methyl vinyl ether, ethyl vinyl ether, n-propyl vinyl ether, isopropyl vinyl ether, vinyl acetate, vinyl propionate, vinyl butyrate, vinyl pivalate are preferably used.

(4) Monomer Mixture

In the above preparation method, the monomer mixture used for obtaining the reactive fluorine-containing copolymer contains, for example, 20 to 70 mol %, and preferably 25 to 55 mol % of hexafluoropropylene (fluorine-containing monomer), 1 to 20, and preferably 3 to 15 mol % of the reactive group-containing monomer, and 10 to 70 mol % of the copolymerizable monomer ①.

By using 20 to 70 mol % of hexafluoropropylene as the fluorine-containing monomer in the monomer mixture, the flurorine content in the obtained reactive fluorine-containing copolymer (the flurorine content of the component (A)) is increased and the solubility in organic solvents of the component (A) is improved. Moreover, the cured coating formed from the resulting composition has sufficient hardness. If the hexafluoropropylene content of the monomer mixture exceeds 70 mol %, the component (A) may exhibit lower solubility in organic solvents, and the cured coating formed from the composition may exhibit inferior transparency and adhesion.

On the other hand, when the content of the reactive group-containing monomer in the monomer mixture is less than 1 mol %, the cured coating formed from the resulting composition exhibits insufficient hardness. When the content of the reactive group-containing monomer in the monomer mixture exceeds 20 mol %, storage stability of the resulting composition becomes lower because the mixture tends to gel so that the cured coating formed from the composition becomes brittle.

(5) Polymerization

The monomer mixture can be polymerized in the presence of a radical polymerization initiator. A method such as an emulsion polymerization method, suspension polymerization method, mass polymerization method, or solution polymerization method can be employed for the polymerization. In addition, the polymerization can be carried out by, for example, a batch type, semi-continuous type, or continuous type process according to the object.

Examples of the radical polymerization initiator used for the polymerization of the monomer mixture include: diacyl peroxides such as acetyl peroxide and benzoyl peroxide; ketone peroxides such as methylethyl ketone peroxide and cyclohexanone peroxide; hydroperoxides such as hydrogen peroxide, tert-butyl hydroperoxide, and cumene hydroperoxide; dialkyl peroxides such as di-tert-butyl peroxide, dicumyl peroxide, and dilauroyl peroxide; peroxyesters such as tert-butyl perxyacetate and tert-butyl peroxypivalate; azo compounds such as azobisisobutyronitrile and azobisisovaleronitrile; and persulfate such as ammonium persulfate, sodium persulfate, and potassium persulfate. Inorganic reducing agents such as sodium hydrogensulfite and sodium pyrosulfite and organic reducing agents such as cobalt naphthenate and dimethylaniline can also be used as required. Further, iodine-containing fluorine compounds such as perfluoroethyl iodide, perfluoropropyl iodide, perfluorobutyl iodide, (perfluorobutyl)ethyl iodide, perfluorohexyl iodide, 2-(perfluorohexyl)ethyl iodide, perfluoroheptyl iodide, perfluorooctyl iodide, 2-(perfluorooctyl)ethyl iodide, perfluorodecyl iodide, 2-(perfluorodecyl)ethyl iodide, heptafluoro-2-iodopropane, perfluoro-3-methylbutyl iodide, perfluoro-5-methylhexyl iodide, 2-(perfluoro-5-methylhexyl)ethyl iodide, perfluoro-7-methyloctyl iodide, 2-(perfluoro-7-methyloctyl)ethyl iodide, perfluoro-9-methyldecyl iodide, 2-(perfluoro-9-methyldecyl)ethyl iodide, 2,2,3,3-tetrafluoropropyl iodide, 1H,H,5H-octafluoropentyl iodide, 1H,1H,7H-dodecafluoroheptyl iodide, tetrafluoro-1,2-diiodoethane, octafluoro-1,4-diiodobuthane, dodecafluoro-1,6-diiodinehexane can be used either individually or in combination with the above organic peroxides, azo compounds, or persulfate.

The reactive fluorine-containing copolymer thus synthesized is a fluorine-containing copolymer having at least one reactive group selected from the group consisting of a hydroxyl group, epoxy group, amino group, and carboxyl group. As described above, the reactive group of the reactive fluorine-containing copolymer is usually introduced by the reactive group-containing monomer.

In addition, by using the carboxyl group-containing monomer as the reactive group-containing monomer and reacting the resulting reactive fluorine-containing copolymer with a diepoxide compound, part or all of the reactive group (carboxyl group) of the reactive fluorine-containing copolymer can be replaced by the epoxy group. Moreover, by using the hydroxyl group-containing monomer as the reactive group-containing monomer and reacting the resulting reactive fluorine-containing copolymer with a polyvalent carboxylic acid anhydride such as maleic anhydride or trimellitic acid anhydride, part or all of the reactive group (hydroxyl group) of the reactive fluorine-containing copolymer can be replaced by the carboxyl group.

(6) Fluorine Content of Reactive Fluorine-containing Copolymer

The fluorine content in the reactive fluorine-containing copolymer is preferably 40 wt % or more, and more preferably 45 to 60 wt %. If the content is less than 40 wt %, the antireflection properties of the copolymer are inferior.

The fluorine content of the reactive fluorine-containing copolymer can be controlled by adjusting the proportion of the fluorine-containing monomer in the monomer mixture.

(7) Intrinsic Viscosity of Reactive Fluorine-containing Copolymer

The intrinsic viscosity (intrinsic viscosity measured at 25° C. in N,N-dimethylacetamide) of the reactive fluorine-containing copolymer is preferably 0.05 to 2.5 dl/g, and more preferably 0.1 to 2.0 dl/g. If the intrinsic viscosity is less than 0.05 dl/g, the coating formed from the resulting composition exhibits insufficient mechanical hardness. On the other hand, if the intrinsic viscosity exceeds 2.5 dl/g, coatability of the resulting composition becomes inferior. A coating can be provided only with difficulty.

(8) Preparation of Fluorine-containing Polymer Having Hydrolyzable Silyl Group

A reactive silane compound having a functional group which can react with the reactive group of the reactive fluorine-containing copolymer is used to introduce a hydrolyzable silyl group into the fluorine-containing polymer of the present invention. This reactive silane compound can be represented by the following general formula (2):

$$X\text{—}SiR^1{}_m(OR^2)_{3-m} \qquad (2)$$

wherein $R^1$ and $R^2$ are respectively the same as defined in the general formula (1), X represents a functional group selected from the group consisting of an epoxy group, amino group, isocyanate group, mercapto group, and acrylic group, which can react with the reactive group of the reactive fluorine-containing copolymer, and m is an integer from 0 to 2.

The functional group X of the reactive silane compound can be selected from the group consisting of an epoxy group, amino group, isocyanate group, mercapto group, and acrylic group corresponding to the type of the reactive group of the reactive fluorine-containing copolymer (A).

The preferable combinations of the reactive group of the reactive fluorine-containing copolymer and the functional group X of the reactive silane compound are shown in Table 1. Of the combinations of "reactive group-functional group X" shown in Table 1, the combinations of a "hydroxyl group-isocyanate group" and an "epoxy group-mercapto group" are particularly preferred.

TABLE 1

| Reactive group of the reactive fluorine-containing copolymer | Functional group X of the reactive silane compound |
|---|---|
| Hydroxyl group | Isocyanate group |
| Epoxy group | Mercapto group |
| | Epoxy group |
| | Amino group |
| Amino group | Isocyanate group |
| | Epoxy group |
| | Acrylic group |
| Carboxyl group | Epoxy group |
| | Amino group |
| | Mercapto group |

Specific examples of the reactive silane compound having an isocyanate group as the functional group X include γ-trimethoxysilylpropylisocyanate, γ-triethoxysilylisocyanate, and the like.

As examples of commercially available products used as the reactive silane compound having an isocyanate group, Y-5187 (manufactured by Nippon Unicar Co., Ltd.: γ-trimethoxysilylpropylisocyanate) and Y-9030 (manufactured by Nippon Unicar Co., Ltd.: γ-triethoxysilylisocyanate) can be given.

As specific examples of the reactive silane compound having a mercapto group as the functional group X, γ-mercaptopropyltrimethoxysilane, γ-mercaptopropylmethyldimethoxysilane, γ-mercaptopropylmethyldiethoxysilane, γ-mercaptopropyltriethoxysilane, γ-mercaptobutyltrimethoxysilane, γ-mercaptophenyltrimethoxysilane, γ-mercaptopropylphenyldimethoxysilane, γ-mercaptopropylbenzyldimethoxysilane, and the like can be given.

As examples of commercially available products used as the reactive silane compound having a mercapto group, SH6062 (manufactured by Toray-Dow Corning Silicone Co., Ltd.: γ-mercaptopropyltrimethoxysilane) and the like can be given.

As specific examples of the reactive silane compound having an amino group as the functional group X, γ-aminopropyltrimethoxysilane, γ-aminopropyltriethoxysilane, γ-aminopropylmethyldiethoxysilane, γ-aminopropylethyldimethoxysilane, and the like can be given.

As examples of commercially available products used as the reactive silane compound having an amino group, SH6020, SH6020P (γ-(2-aminoethyl)aminopropyltrimethoxysilane), SZ6023 (γ-(2-aminoethyl)aminopropylmethyldimethoxysilane), SZ6083 (γ-anilinopropyltrimethoxysilane), SH6026, SZ6050 (above, manufactured by Toray-Dow Corning Silicone Co., Ltd.), APS-E (manufactured by Chisso Corp.: aminopropyltriethoxysilane), A-1102 (aminopropyltriethoxysilane), A-1170 (N,N-bis(γ-trimethoxysilylpropyl)amine), and Y-9669 (N-(γ-trimethoxysilylpropyl) aniline) (above, manufactured by Nippon Unicar Co., Ltd.) can be given.

As specific examples of the reactive silane compound having an epoxy group as the functional group X, γ-glycidoxypropyltrimethoxysilane, γ-glycidoxypropylmethyldimethoxysilane, γ-glycidoxypropyltriethoxysilane, γ-glycidoxypropyltripropoxysilane, γ-glycidoxypropyltributoxysilane, γ-glycidoxypropyldimethoxyethoxysilane, γ-glycidoxypropyltriphenoxysilane, γ-glycidoxybutyltrimethoxysilane, δ-glycidoxybutyltrimethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)propyltriethoxysilane, γ-(3,4-epoxycyclohexyl)propyltrimethoxysilane, γ-(3,4-epoxycyclohexyl)propyltriethoxysilane, δ-(3,4-epoxycyclohexyl)propyltrimethoxysilane, glycidoxymethylmethyldiethoxysilane, glycidoxymethylmethyldimethoxysilane, glycidoxypropylphenyldimethoxysilane, γ-glycidoxypropylmethyldiethoxysilane, and the like can be given.

As examples of commercially available products used as the reactive silane compound having an epoxy group, SH6040 (γ-glycidoxypropyltrimethoxysilane), AY43-026 (γ-glycidoxypropylmethyldimethoxysilane) (above, manufactured by Toray-Dow Corning Silicone Co., Ltd.), S-530 (manufactured by Chisso Corp.: β-(3,4-epoxycyclohexyl)ethyltrimethoxysilane), AZ-6137 (γ-glycidoxypropylmethyldimethoxysilane), AZ-6165 (γ-glycidoxypropylmethyldiethoxysilane), and AZ-6173 (γ-glycidoxypropyltriethoxysilane) (above, manufactured by Nippon Unicar Co., Ltd.), and the like can be given.

As specific examples of the reactive silane compound having an acrylic group as the functional group X, γ-methacryloxypropyltrimethoxysilane, γ-acryloxypropyltrimethoxysilane, γ-methacryloxypropylmethyldimethoxysilane, γ-methacryloxypropyltriethoxysilane, γ-acryloxypropyltriethoxysilane, and the like can be given.

As examples of commercially available products used as the reactive silane compound having an acrylic group, SZ-6030 (γ-methacryloxypropyltrimethoxysilane), AY-43-060 (γ-methacryloxypropylmethyldimethoxysilane) (above, manufactured by Toray-Dow Corning Silicone Co., Ltd.), Y-9910 (γ-methacryloxypropylmethyldimethoxysilane), and Y-9936 (γ-methacryloxypropyltriethoxysilane) (above, manufactured by Nippon Unicar Co., Ltd.) can be given.

These reactive silane compounds having either the same reactive group or different reactive groups can be used either individually or in combinations of two or more as long as the reaction between these silane compounds can be avoided.

The component (A), which is the fluorine-containing polymer having a hydrolyzable silyl group, is obtained by the reaction of the above reactive fluorine-containing copolymer with the above reactive silane compound. Although the types of the reactive fluorine-containing copolymer and the reactive silane compound, which are reacted to obtain the component (A), are not limited as long as the reactive group of the former compound can react with the functional group X of the latter compound, it is preferable that these compounds be selected according to the combinations shown in Table 1.

The proportion of the reactive fluorine-containing copolymer and the reactive silane compound, which are reacted to obtain the component (A), is preferably 1 to 50 and more preferably 5 to 40 parts by weight of the reactive silane compound for 100 parts by weight of the reactive fluorine-containing copolymer.

If the amount of reactive silane coupling agents used is too small, the coating formed from the prepared composition exhibits insufficient scratch resistance. On the other hand, if the amount is too large, the refraction index of the cured coating formed from the prepared composition becomes higher, whereby excellent antireflection properties and the like cannot be obtained.

As a method for mixing the reactive fluorine-containing copolymer and the reactive silane compound, a method such as mixing in an organic solvent and mixing using a mixer, a roller mill, or a kneader machine can be employed without any specific limitations.

The reactive fluorine-containing copolymer can be reacted with a reactive silane compound by a method, for example, of stirring the mixture of these compounds and organic solvents for 30 minutes to 72 hours at a temperature in the range from the freezing point to the boiling point of these components, and preferably at 0 to 100° C. The reaction time can be reduced by the addition of a reaction accelerator to the reaction system. As examples of the reaction accelerator, organic tin compounds such as dibutyltin dilaurate, dibutyltin diacetate, and octyltin trilaurate, Lewis acids represented by zinc compounds such as zinc dilaurate and the like, Lewis bases represented by tertiary amines such as triethylamine, tributylamine, tricyclohexylamine, and the like can be given. The amount of reaction accelerators used is usually in the range from 0.001 to 1.0 part by weight for 100 parts by weight of the reactive fluorine-containing copolymer.

As a method for preparing the fluorine-containing polymer having a hydrolyzable silyl group, in addition to the above silyl group-modification method, a method for preparing the fluorine-containing polymer by polymerization of a monomer mixture of the fluorine-containing monomer, a compound having a hydrolyzable silyl group and an unsaturated bond in the molecule (hereinafter called "polymerizable silane compound"), and a monomer which is copolymerizable with the above compounds (hereinafter called "copolymerizable monomer ②") (hereinafter called "copolymerization method") can be given.

As the fluorine-containing monomer used in the above preparation method (copolymerization method), the same compounds as the fluorine-containing monomers used for obtaining the reactive fluorine-containing copolymer in the silane-modification method can be given.

The polymerizable silane compound used in the above preparation method (copolymerization method) is a compound having a hydrolyzable silyl group ($-SiR^1{}_m(OR^2)_{3-m}$) and an unsaturated bond such as a vinyl group or (meth) acrylic group in the molecule. Specific examples of the polymerizable silane compound include: vinylsilanes such as vinyltrimethoxysilane, vinylmethyldimethoxysilane, vinyldimethylmethoxysilane, vinyltriethoxysilane, vinylmethyldiethoxysilane, vinyldimethylethoxysilane, vinyltributoxysilane, vinylmethyldibutoxysilane, vinyldimethylbutoxysilane, vinyltriphenoxysilane, vinylmethyldiphenoxysilane, vinyldimethylphenoxysilane, vinyltriacetoxysilane, vinylmethyldiacetoxysilane, vinyldimethylacetoxysilane, 2-propenyltrimethoxysilane, and 2-propenyltriethoxysilane; methacryl silanes such as methacryloxypropyltrimethoxysilane, methacryloxypropylmethyldimethoxysilane, and methacryloxypropyldimethylmethoxysilane; acrylic silanes such as acryloxypropyltrimethoxysilane, acryloxypropylmethyldimethoxysilane, and acryloxypropyldimethylmethoxysilane. Of these compounds, vinyl silanes such as vinyltrimethoxysilane, vinylmethyldimethoxysilane, vinyldimethylmethoxysilane, vinyltriethoxysilane, vinylmethyldiethoxysilane, vinyldimethylethoxysilane, vinyltributoxysilane, vinylmethyldibutoxysilane, vinyldimethylbutoxysilane, vinyltriphenoxysilane, vinylmethyldiphenoxysilane, vinyldimethylphenoxysilane, vinyltriacetoxysilane, vinylmethyldiacetoxysilane, vinyldimethylacetoxysilane, 2-propenyltrimethoxysilane, and 2-propenyltriethoxysilane are preferable, and vinyltrimethoxysilane, vinylmethyldimethoxysilane, vinyltriethoxysilane, vinylmethyldiethoxysilane, vinyltributoxysilane, and vinylmethyldibutoxysilane are particularly preferable.

There are no specific limitations to the copolymerizable monomer ② used in the above preparation method (copolymerization method) as long as the copolymerizable monomer ② is copolymerizable with the fluorine-containing monomer or the polymerizable silane compound. As examples of the copolymerizable monomer ②, the compounds given as examples of the copolymerizable monomer ① and the reactive group containing monomer in the silane-modification method can be given.

In addition, a photopolymerizable group or a photo cross-linking group can be introduced to the fluorine-containing polymer having a reactive group by reacting the reactive group with a compound having a photopolymerizable or a photo cross-linking group.

Preparation of Fluorine-containing Polymer Having Siloxane Structure

The fluorine-containing polymer of the present invention may be a polymer having a siloxane structure (—SiO—) on its main chain. It is preferable to use the fluorine-containing polymer having a siloxane structure as the fluorine-containing polymer of the present invention, because such a polymer excels in scratch resistance and stain-removing properties.

In the present invention, the fluorine-containing copolymer having a siloxane structure on its main chain can be prepared by polymerization of (a) an olefin monomer containing a fluorine atom (hereinafter called component (a)), (b) a vinyl ether monomer (hereinafter called component (b)), and (c) an azo group-containing polysiloxane compound (hereinafter called component (c)) in the presence of (e) a reactive emulsifying agent (hereinafter called component (e)).

As the component (a) used in the preparation of the fluorine-containing copolymer, a compound having at least one unsaturated double bond group and at least one fluorine atom can be given. Specific examples include the fluorine-containing monomers given above.

A fluorine-containing copolymer having a functional group can be prepared by copolymerization of the above monomers and a functional group-containing monomer. A hydroxyl group and an epoxy group are particularly preferable as such a functional group. As specific examples of this functional group-containing monomer, the functional group-containing monomers mentioned above can be given.

Of the other monomers of the above copolymerizable monomers, alkyl vinyl ethers, cycloalkyl vinyl ethers, and carboxylic acid vinyl esters are suitably used for achieving a high yield in the polymerization of the fluorine-containing copolymer of the present invention.

In particular, with respect to increasing the fluorine content of the fluorine-containing copolymer, low molecular-weight monomers such as methyl vinyl ether, ethyl vinyl ether, n-propyl vinyl ether, isopropyl vinyl ether, vinyl acetate, vinylpropionic acid, vinylbutyric acid, and vinylpivalic acid are preferable.

Further, the use of branched monomers such as isopropyl vinyl ether, tert-butyl vinyl ether, and pivalic acid vinyl is effective for achieving high hardness and a low refraction index of the coating formed from the composition.

The azo group-containing polysiloxane compound, which is the component (c) of the fluorine-containing copolymer having a siloxane structure on the main chain, contains an azo group (—N=N—) which is easily decomposed with heat, in addition to a polysiloxane segment represented by the following general formula (3). The azo group-containing polysiloxane compound can be prepared by the method disclosed in Japanese Patent Application Laid-open No. 93100/1994, for example.

As examples of such a compound, a compound represented by the following general formula (3) can be given;

fluoroolefin/(perfluoroalkoxyalkyl)vinyl ether/alkyl vinyl ether/polydimethylsiloxane unit. When the composition of the present invention is used as an optical coating material, it is preferable to copolymerize a nonionic reactive emulsifying agent from the viewpoint of coatability.

When the nonionic reactive emulsifying agent is used, examples of the combinations include: fluoroolefin/alkyl vinyl ether/hydroxyl group or epoxy group-containing vinyl ether/polydimethylsiloxane unit/nonionic reactive emulsifying agent, fuoroolefin/perfluoro(alkyl vinyl ether)/alkyl vinyl ether/hydroxyl group or epoxy group-containing vinyl ether/polydimethylsiloxane unit/nonionic reactive emulsifying agent, fluoroolefin/perfluoro(alkoxyalkyl)vinyl ether/alkyl vinyl ether/hydroxyl group or epoxy group-containing vinyl ether/polydimethylsiloxane unit/nonionic reactive

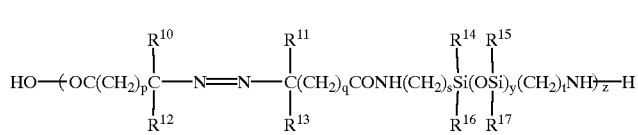

(3)

wherein $R^{10}$ to $R^{13}$ are individually a hydrogen atom, an alkyl group, or a cyano group, $R^{14}$ to $R^{17}$ are individually a hydrogen atom or an alkyl group, p and q individually indicate an integer from 1 to 6, s and t individually indicate an integer from 0 to 6, y is an integer from 1 to 200, and z is an integer from 1 to 20.

In the present invention, the compound represented by the following general formula (4) is preferable as the compound represented by the above general formula (3).

emulsifying agent, fluoroolefin/(perfluoroalkyl)vinyl ether/alkyl vinyl ether/hydroxyl group or epoxy group-containing vinyl ether/polydimethylsiloxane unit/nonionic reactive emulsifying agent, fluoroolefin/(perfluoroalkoxyalkyl)vinyl ether/alkyl vinyl ether/hydroxyl group or epoxy group-containing vinyl ether/polydimethylsiloxane unit/nonionic reactive emulsifying agent, and the like.

Polymerization of the fluorine-containing polymer having a siloxane structure on the main chain can be carried out in

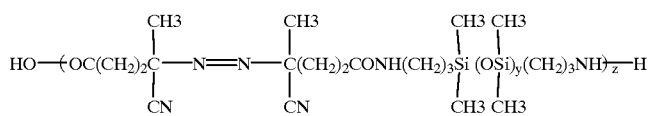

(4)

As the component (e), a nonionic reactive emulsifying agent can be given. Copolymerization of the reactive emulsifying agent significantly improves coatability of the fluorine-containing copolymer of the present invention when used as a coating material.

As examples of the nonionic reactive emulsifying agent, a compound represented by the following general formula (5) can be given:

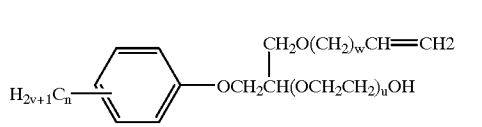

(5)

wherein v is an integer from 1 to 20, w is an integer from 0 to 4, and u is an integer from 3 to 50.

Specific combinations of the components (a), (b), and (c) of the present invention are, for example, combinations of fluoroolefin/alkyl vinyl ether/polydimethylsiloxane unit, fluoroolefin/perfluoro(alkyl vinyl ether)/alkyl vinyl ether/polydimethylsiloxane unit, fluoroolefin/perfluoro(alkoxyalkyl)vinyl ether/alkyl vinyl ether/polydimethylsiloxane unit, fluoroolefin/(perfluoroalkyl)vinyl ether/alkyl vinyl ether/polydimethylsiloxane unit, and the presence of a radical polymerization initiator by the emulsification method, suspension polymerization method, mass polymerization method, or solution polymerization method. The manner of operation can be suitably selected from a batch type, semi-continuous type, or continuous type.

In addition, since the azo group-containing polysiloxane which is the component (c) is a heat radical generating agent itself, this agent can be used as a polymerization initiator for specific fluoroolefin polymers. Other radical initiators can be simultaneously used together.

The proportions of components (a) to (c), and (e) when optionally used, can be adjusted corresponding to the composition of the objective copolymer. These components are polymerized in the proportion of usually 20 to 70 mol % of the component (a), 10 to 70 mol % of the component (b), 0.1 to 10 mol % of the component (c), and 0.1 to 5 mol % of the component (e) as required.

Incorporation of fluorine-containing polymer having a siloxane structure ensures easy removal of steins attached to the coating produced from the composition of the present invention.

<Intrinsic Viscosity of Component (A)>

The intrinsic viscosity of the component (A) is preferably 0.1 to 2.0, and more preferably 0.05 to 2.5 dl/g. If the intrinsic viscosity of the component (A) is lower than 0.05 dl/g, the coating formed from the prepared composition exhibits insufficient mechanical hardness. On the other hand, if the intrinsic viscosity of the component (A) exceeds 2.5 dl/g, coatability of the resulting composition becomes inferior, making it difficult to produce the thin coatings (thickness of approximately 0.02 to 1.00 μm) required to ensure an antireflection effect and the like.

<Component (B)>

The component (B) of the composition of the present invention is at least one of the compounds selected from the silane compounds represented by the above general formula (1) and the partial condensation products of these silane compounds. By using the component (B) as one of the components, scratch resistance of the cured coating formed from the composition of the present invention can be markedly improved.

As specific examples of the silane compound represented by the above general formula (1), tetraalkoxysilanes such as tetramethoxysilane, tetraethoxysilane, tetraisopropoxysilane, tetra-n-butoxysilane, and tetraphenoxysilane; alkyltrialkoxysilanes such as methyltrimethoxysilane, methyltriethoxysilane, ethyltrimethoxysilane, n-butyltrimethoxysilane, isobutyltrimethoxysilane, and isobutyltriethoxysilane; aryltrialkoxysilanes such as phenyltrimethoxysilane and phenyltriethoxysilane; aralkyltrialkoxysilanes such as benzyltrimethoxysilane; dialkyldialkoxysilanes such as dimethyldimethoxysilane, dimethyldiethoxysilane, and dibutyldimethoxysilane; diaryldialkoxysilanes such as diphenyl dimethoxysilane, and the like can be given. These compounds can be used either individually or in combinations of two or more.

Of these compounds, tetraalkoxysilanes such as tetramethoxysilane and tetraethoxysilane and alkyltrialkoxysilanes such as methyltrimethoxysilane and methyltriethoxysilane are preferable from the viewpoint of the superior scratch resistance of the cured product.

Commercially available products of these alkoxysilanes include: SS-1900 (tetraethoxysilane), SS-1670 (methyltrimethoxysilane), SS-1650 (methyltriethoxysilane), SS-1840 (phenyltrimethoxysilane), SS-1830 (phenyltriethoxysilane), SS-1130 (n-butyltrimethoxysilane), SS-1260 (dimethyldimethoxysilane), SS-1250 (dimethyldiethoxysilane), and SS-1300 (diphenyldimethoxysilane) (above, manufactured by Toray-Dow Corning Silicone Co., Ltd.).

The amount of the component (B) used in the composition of the present invention is usually 10 to 400 parts by weight, preferably 30 to 300 parts by weights, and more preferably 50 to 200 parts by weight, for 100 parts by weight of the component (A) as the solid content after the hydrolysis and condensation reaction. By using the component (B) in the above proportion, cured coating having well-balanced characteristics such as scratch resistance, antireflection properties, and low refraction index can be formed. If the amount of the component (B) is too small, the coating formed from the composition exhibits insufficient scratch resistance. On the other hand, if the amount is too large, the coating formed from the composition exhibits a low refraction index and inferior transparency.

The proportion of the component (A) and component (B) used in the composition of the present invention is in the range from 3:97 to 95:5.

<Component (C)>

The component (C) of the composition of the present invention is a chelate complex derived from a metal alkoxide represented by the above general formula (1).

By using the component (C) in the composition of the present invention, transparency and adhesion to a substrate of the cured coating formed from the composition can be significantly improved. These effects are considered to be brought about by the catalytic action of the component (C) to efficiently bond the component (A) and (B) in the hydrolysis and condensation reaction.

The component (C) can be synthesized from a metal alkoxide and a chelating agent according to the following reaction formula.

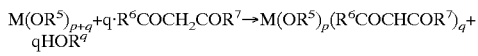

$$M(OR^5)_{p+q} + q \cdot R^6COCH_2COR^7 \rightarrow M(OR^5)_p(R^6COCHCOR^7)_q + qHOR^q$$

wherein M represents aluminum, titanium, or zirconium, $R^5$ is a hydrogen atom, an alkyl group or acyl group having 1–10 carbon atoms, $R^6$ is an alkyl group having 1–6 carbon atoms, $R^7$ represents an alkyl group or acyl group having 1–16 carbon atoms, p is an integer from 0 to 3, and q is an integer from 1 to 4. When two or more groups ($OR^5$) or ($R^6COCHCOR^7$) are present, these groups may be either the same or different. In this formula "$R^6COCH_2COR^7$" represents the chelating agent obtained from a β-diketone or β-keto ester. The reaction of metal alkoxide with the chelating agent is an exchange reaction of an enol type hydroxyl group among the tautomers of the chelating agent with an alkoxy group of the metal alkoxide. Such a reaction can be carried out usually at a temperature in the range from room temperature to the decomposition temperature and the boiling point of both the reactants and resulting products in the presence or absence of a solvent. After the reaction, the chelate complex of the metal alkoxide, which is the component (C), is obtained by removing the solvent, alcohols produced as by-products, and the like, as required.

Examples of the metal alkoxides used in the preparation of the component (C) include: aluminum alkoxides such as aluminum trimethoxide, aluminum triethoxide, aluminum triisopropoxide, aluminum tributoxide, and aluminum triphenoxide; titanium alkoxides such as titanium tetramethoxide, titanium tetraethoxide, titanium tetraisopropoxide, titanium tetrabutoxide, titanium tetra-2-ethylhexyloxide, and titanium tetraphenoxide; zirconium alkoxides such as zirconium tetramethoxide, zirconium tetraethoxide, zirconium tetraisopropoxide, titanium tetrabutoxide, titanium tetra-2-ethylhexyloxide, zirconium tetraphenoxide, and the like.

As examples of the chelating agent used in preparation of the component (C), β-diketones such as acetylacetone, benzoylacetone, and dibenzoylmethane and β-keto esters such as methyl acetoacetate, ethyl acetoacetate, butyl acetoacetate, phenyl acetoacetate, benzoyl acetanilide, and the like can be given.

Specific examples of the chelate complex which can be used as the component (C) include: chelate complexes of aluminum alkoxide such as aluminum (III) s-butoxide bis (ethyl acetoacetate), aluminum (III) di-s-butoxideethyl acetoacetate, aluminum (III) diisopropoxideethyl acetoacetate, aluminum tris (ethyl acetoacetate), and aluminum (III) 9-octadecenyl acetoacetate diisopropoxide; chelate complexes of titanium alkoxide such as titanium (IV) tris-i-propoxideethyl acetoacetate, titanium (IV) bis-i-propoxide-bis-(ethyl acetoacetate), titanium (IV) tris-n-butoxideethyl acetoacetate, titanium (IV) bis-n-butoxide-bis (ethyl acetoacetate), and titanium (IV) tris-n-butoxideacetyl acetonate; chelate complexes of zirconium alkoxide such as zirconium (IV) tris-n-butoxideethyl acetoacetate, zirconium (IV) bis-n-butoxide-bis(ethyl acetoacetate), zirconium (IV) tris-n-butoxideacetyl acetonate, zirconium (IV) bis-i-propoxide-bis(ethyl acetoacetate), and the like.

Of these, chelate compounds of acetoacetic esters such as aluminum tris(ethyl acetoacetate), titanium (IV) tris-i-propoxideethyl acetoacetate, zirconium (IV) tris-n-butoxideethyl acetoacetate, and zirconium (IV) bis-i-propoxide-bis(ethyl acetoacetate) are preferable from the viewpoint of the reactivity and solubility.

The amount of the component (C) used in the composition of the present invention is preferably 0.001 to 0.01 mol %, and more preferably 0.0001 to 0.01 mol % for the total mols of alkoxy groups of the components (A) and (B). If the amount of the component (C) is too small, the coating formed from the composition exhibits insufficient scratch resistance. On the other hand, if the amount is too large, the storage stability of the resulting composition often decreases.

<Optional Components>

The composition of the present invention may contain components other than the components (A),(B), and (C). Inorganic fine particles, organic solvents, antioxidants, UV absorbers, leveling agents, anti-foaming agents, slipping agents, and the like can be given as examples of such a component.

(1) Fine Inorganic Particles

As the fine inorganic particles contained in the composition of the present invention, fine metal oxide particles such as fine alumina particles and fine silica particles are preferable and colloidal silica is particularly preferable.

When the fine inorganic particles are used as one of the components of the composition of the present invention, the cured coating formed from the composition exhibits a more improved scratch resistance.

The average particle diameter of colloidal silica, which is suitably used as the fine inorganic particles of the present invention, is preferably 0.001 to 0.100 $\mu$m, and more preferably 0.001 to 0.050 $\mu$m. If the average particle diameter of colloidal silica is greater than 0.100 $\mu$m, transparency of the cured coating formed from the resulting composition tends to deteriorate.

The amount of colloidal silica used in the composition of the present invention is 5 to 80, and preferably 10 to 50 parts by weight as the solid content for 100 parts by weight of the component (A). If the amount exceeds 80 parts by weight, transparency of the cured coating formed from the prepared composition tends to be impared.

Colloidal silica is usually used dispersed in a dispersion medium. As examples of the dispersion medium, water and organic solvents can be given. When water is used as the dispersion medium for colloidal silica, it is preferable that the pH of the dispersion medium be adjusted to 2 to 10, and preferably 3 to 7.

As examples of organic solvents suitably used as the dispersion medium for colloidal silica, alcohols such as methyl alcohol, isopropyl alcohol, ethylene glycol, butanol, and ethyleneglycol monopropyl ether; ketones such as methyl ethyl ketone and methyl isobutyl ketone; aromatic hydrocarbons such as toluene and xylene; amides such as dimethylformamide, dimethylacetamide, and N-methylpyrrolidone; esters such as ethyl acetate, butyl acetate, and γ-butyrolactone; ethers such as tetrahydrofuran and 1,4-dioxane; and the like can be given. Among these, alcohols and ketones are preferable. These organic solvents can be used as the dispersion medium either individually or in combinations of two or more.

As commercially available products of water-dispersed colloidal silica, ST-UP, ST-O-UP, ST-20, ST-40, ST-C, ST-N, ST-O, ST-50, ST-OL (above, manufactured by Nissan Chemical Industries, Ltd.), and the like can be given.

As commercially available products of organic solvent-dispersed colloidal silica, Methanol Silica Sol, IPA-ST, MEK-ST, NBA-ST, XBA-ST, DMAC-ST (above, manufactured by Nissan Chemical Industries, Ltd.), and the like can be given.

In addition, colloidal silica prepared from the silane compound represented by the above formula (1) by the hydrolysis and condensation reaction in the dispersion medium can be used.

(2) Organic Solvents

As the organic solvents used in the composition of the present invention, ketones such as acetone, methyl ethyl ketone, esters such as ethyl acetate and butyl acetate, methyl isobutyl ketone, alcohols such as methanol, ethanol, isopropyl alcohol, and butanol, hydrocarbons such as toluene and xylene, ethers such as tetrahydrofuran, 1, 4-dioxane, and carbitol, and the like can be given.

(3) Antioxidant

As the antioxidants used in the composition of the present invention, Irganox-1010, -1035, -1076, and -1222 (manufactured by Ciba-Geigy) can be given.

(4) UV Absorbers

As the UV absorbers used in the composition of the present invention, TINUVIN-P234, -320, -326, -327, -328, -213, -329 (manufactured by Ciba-Geigy) can be given.

<Hydrolysis and Condensation Reaction>

Water is added before the composition of the present invention is used, whereby the components (A) and (B) are bonded by the hydrolysis (the hydrolysis of an alkoxy group) and condensation reaction (the formation of a siloxane bond). The composition of the present invention includes the composition containing the polysiloxane formed by the bonding of the components (A) and (B).

This hydrolysis and condensation reaction is typically carried out as follows. To the mixture of 100 parts by weight of the component (A), 10 to 400 parts by weight of the component (B), and 0.0001 to 0.01 mol % of the component (C) for the total mols of alkoxy groups of the components (A) and (B) (the composition of the present invention), water is usually added in the proportion of 0.3 to 1.0 mol, and preferably 0.4 to 0.6 mol per 1 mol of the total alkoxy groups in the mixture to hydrolyze alkoxy silanes in the components (A) and (B) and condense the silanol formed to prepare the polysiloxane. Because the component (C) consisting of the chelate complex of the specific metal alkoxide is in this reaction system, the hydrolysis and condensation reaction (bonding reaction of the component (A) with the component (B)) can be efficiently carried out by the catalytic action of the component (C).

In carrying out the hydrolysis and condensation reaction, the reaction mixture is stirred for 30 minutes to 72 hours in dry air under atmospheric pressure at a temperature in the range from 0 to the boiling point of the major solvent, preferably from 30 to 120° C.

In addition, the reaction time can be shortened by the addition of a reaction accelerator consisting of an acid or base to this reaction system to the extent that the storage stability of the composition is not impaired. As examples of the acids which can be used as the reaction accelerator, inorganic acids such as hydrochloric acid, sulfuric acid, and nitric acid and organic acids such as oxalic acid, acetic acid, formic acid, methanesulfic acid, toluenesulfic acid can be given. As examples of the bases which can be used as the reaction accelerator, inorganic bases such as sodium hydroxide, potassium hydroxide, and ammonia, ammonium hydroxide such as tetramethylammonium hydroxide and tetrabutylammonium hydroxide, amines such as triethylamine and tributyl amine can be given.

Moreover, in order to extend the applicable time of the composition of the present invention, as required, an excess amount of chelating agent can be added. For example, acetylacetone, tri ethanolamine, and diethanolamine can be given as such a chelating agent. The amount of chelating agent to be added is equivalent to or more than the amount (mol) of the component (C), preferably 2 to 6 times the mol of the component (C). These chelating agents are added after the preparation of the composition.

As examples of substrates to which the composition of the present invention is applied, transparent substrates made of plastic, glass, ceramic, and the like can be given and, in particular, substrates made of transparent resins such as polycarbonate, poly (meth) acrylate, polyallylate, polyolefin, and polyester are preferable. It is preferable that the refraction index of the transparent substrate be 1.40 or more. In this specification, refraction index means a value measured by Abbe's refractometer with the sodium D line as the light source (measurement temperature of 20° C.).

As a method for coating the composition of the present invention onto substrates, a dipping method, spin coating method, flow coating method, roll coating method, spray coating method, screen printing method, and the like are employed without no specific limitation. The dipping method and spin coating method are particularly preferred because of ease of controlling the thickness of coatings.

The coating produced by applying the composition of the present invention to the surface of substrates is dried at a temperature below the deformation temperature of the substrates, usually at 0 to 300° C., and preferably 50 to 150° C., for 10 seconds to 24 hours, and preferably 30 seconds to 1 hour. The drying time (curing time) can be shortened by the addition of a curing accelerator to the composition of the present invention,. As specific examples of the curing accelerator, organic tin compounds such as dibutyltin dilaurate, dibutyltin diacetate, and octyltin trislaurate; metal alkoxides such as tetraisoproxy aluminum, and tetrabutoxy zirconium; and amino silanes such as aminopropyltriethoxysilane and aminoethylaminopropyltrimethoxysilane, can be given.

The thickness of the cured coating formed from the composition of the present invention on the surface of substrates is usually 0.02 to 1.00 µm, and preferably 0.05 to 0.50 µm.

The refraction index of the cured products formed from the composition of the present invention is preferably 1.42 or less, and more preferably 1.40 or less, from the view point of the superior antireflection effect when applied to substrates made of transparent resins.

EXAMPLES

The present invention will now be described in detail by way of examples which should not be construed as limiting the present invention. In the examples below, "parts" indicates "parts by weight" unless otherwise specified.

Preparation Example 1

A 1.5 l stainless steel autoclave equipped with an electromagnetic stirrer and for which the internal atmosphere was replaced with nitrogen gas was charged with 500 g of ethyl acetate (solvent), 57.2 g of ethyl vinyl ether (copolymerizable monomer ①), 10.2 g of hydroxybutyl vinyl ether (reactive group-containing monomer), and 3.0 g of lauroyl peroxide (radical polymerization initiator). After cooling the solution in the autoclave to −50° C. with dry ice-methanol, the oxygen in the system was again replaced with nitrogen gas.

Then, 146.0 g of hexafluoropropylene was added to the solution in the autoclave to prepare a monomer solution. The monomer solution was heated to 60° C., at which the pressure in the autoclave was 5.3 kgf/cm$^2$.

Polymerization was continued for 20 hours while stirring the solution at 60° C. After 20 hours when the pressure in the autoclave was decreased to as low as 1.5 kgf/cm$^2$, the autoclave was cooled with water to terminate the polymerization. After cooling the reaction solution to room temperature, the unreacted monomers were removed, then the autoclave was left open and a polymer solution with a solid concentration of 28.1% was removed.

The resulting polymer solution was poured into a large quantity of methanol to precipitate the polymer. The precipitate was washed with methanol and dried under vacuum at 50° C. As a result of the above process, 193 g of the reactive fluorine-containing copolymer having a hydroxyl group (hereinafter called "copolymer (1)") was obtained.

① The intrinsic viscosity ($\eta$) at 25° C. in N,N-dimethylacetamide, ② the fluorine content by the Alizarin Complexon method, and ③ the refraction index of the resulting copolymer (1) were measured. The monomer composition which constitutes the reactive fluorine-containing copolymer was determined (mol fraction) from the results of NMR measurements ($^1$H-NMR and $^{13}$C-NMR), elemental analysis, and the fluorine content. The results are shown in Table 2.

Preparation Example 2–4

The reactive fluorine-containing copolymers (hereinafter called "copolymers (2) to (4)") were obtained according to the formulations shown in Table 2 and using the same method as in the Preparation Example 1 except for changing the composition of the monomer solution (the types and amounts of the monomers).

The intrinsic viscosity ($\eta$), the glass transition temperature (Tg), the flurorine content, the hydroxyl group valence, and the refraction index of the resulting copolymers (2) to (4) were measured in the same manner as in the Preparation Example 1 to determine the monomer composition (mol fraction). These results are shown in Table 2.

TABLE 2

| Preparation Example | | 1 | 2 | 3 | 4 |
|---|---|---|---|---|---|
| Reactive fluorine-containing copolymer | | Copolymer (1) | Copolymer (2) | Copolyser (3) | Copolymer (4) |
| Composition of monomer solution (g) | Hexafluoropropylene | 146.0 | 143.0 | 134.0 | 140.2 |
| | Ethyl vinyl ether | 57.2 | 50.0 | 39.4 | 53.9 |
| | Hydroxybutyl vinyl ether | 10.2 | 20.0 | — | 10.9 |
| | Glycidyl vinyl ether | — | — | 36.6 | — |

TABLE 2-continued

| Preparation Example | | 1 | 2 | 3 | 4 |
|---|---|---|---|---|---|
| Composition of monomer (mol %) | vinyl acetate | — | — | — | 8.1 |
| | Ethyl acetate | 500.0 | 500.0 | 500.0 | 500.0 |
| | Lauroyl peroxide | 3.0 | 3.0 | 3.0 | 3.0 |
| | Hexafluoropropylene | 50.5 | 49.9 | 50.0 | 50.0 |
| | Ethyl vinyl ether | 44.1 | 41.0 | 38.5 | 40.0 |
| | Hydroxybutyl vinyl ether | 5.4 | 9.1 | | 5.5 |
| | Glycidyl vinyl ether | | | 19.5 | |
| | Vinyl acetate | | | | 4.5 |
| Intrinsic viscosity ($\eta$) | | 0.26 | 0.30 | 0.31 | 0.28 |
| Fluorine content (wt %) | | 50.5 | 49.5 | 47.5 | 50.0 |
| Refraction index | | 1.38 | 1.38 | 1.38 | 1.38 |

Preparation Example 5

A 2.0 l stainless steel autoclave equipped with an electromagnetic stirrer and for which the internal atmosphere was replaced with nitrogen gas was charged with 500 g of ethyl acetate (solvent), 53.2 g of perfluoro(propyl vinyl ether), 48.7 g of ethyl vinyl ether (EVE), 26.4 g of hydroxybutyl vinyl ether (HBVE), 20.0 g of Adeca Learsoap NE-30 (manufactured by Asahi Denka Kogyo Co., Ltd.) as a nonionic reactive emulsifying agent, 3.0 g of VPS-1001 (manufactured by Wako Pure Chemicals Co., Ltd.) as an azo group-containing polydimethylsiloxane, and 1.0 g of lauroyl peroxide (LPO). After the mixture was cooled to -50° C. with dry ice-methanol, oxygen in the system was replaced with nitrogen gas.

After the addition of 120.0 g of hexafluoropropylene (HFP), the mixture was heated to 60° C., at which time the pressure in the autoclave was 6.1 kgf/cm². Polymerization was continued for 20 hours while stirring the mixture at 60° C. After the pressure in the autoclave was decreased to as low as 2.5 kgf/cm², the autoclave was cooled with water to terminate the polymerization. After cooling the reaction solution to room temperature, the unreacted monomers were removed, then the autoclave was left open and a polymer solution was removed. The resulting polymer solution was poured into a large quantity of methanol to precipitate the polymer. The precipitate was washed with methanol and dried under vacuum at 50° C. As a result of this procedure, 221 g of a reactive fluorine-containing copolymer was obtained.

The resulting polymer was dissolved in tetrahydrofuran (THF) to a concentration of 0.5%. The number average molecular weight of the resulting polymer measured by GPC was 35,000.

Example 1

According to the formulations shown in Table 3, 100 parts of the copolymer (1) having a hydroxyl group prepared in Preparation Example 1, 10 parts of γ-triethoxysilyl isocyanate (reactive silane compound), 550 parts of methyl ethyl ketone, and 0.01 part of dibutyltin dilaurate were stirred for 12 hours at 20° C. under a nitrogen gas atmosphere to react the copolymer (1) with γ-triethoxysilyl isocyanate.

An excess amount of dibutylamine was added to part of the resulting reaction solution to determine the amount of unreacted dibutylamine by titration with 0.1 N hydrochloric acid, whereby the concentration of a residual isocyanate group in the reactant solution was measured. It was confirmed that the isocyanate group had been consumed. In addition, an IR spectrum of a film prepared by coating a portion of the reaction solution on an NaCl substrate and drying under nitrogen atmosphere confirmed that there was no peak originating from the isocyanate group. These results show that the reaction of the copolymer (1) and γ-triethoxysilyl isocyanate had been completed and the component (A) which is the silane-modified fluorine-containing polymer was formed.

240 parts of methyltrimethoxysilane (component (B)), 48 parts of ion exchanged water, and 7.8 parts of aluminum tris(ethyl acetoacetate) (component (C)) were added to the resulting reaction solution (the solution containing the component (A)). The mixture was subjected to a hydrolysis and condensation reaction while being stirred for 6 hours at 60° C. to prepare the composition (1) of the present invention.

Example 2

According to the formulations shown in Table 3, 100 parts of the copolymer (2) having a hydroxyl group prepared in Preparation Example 2, 20 parts of γ-triethoxysilyl isocyanate (reactive silane compound), 750 parts of methyl ethyl ketone, and 0.01 part of dibutyltin dilaurate were stirred for 12 hours at 20° C. under a nitrogen gas atmosphere to react the copolymer (2) with γ-triethoxysilyl isocyanate to obtain the component (A).

240 parts of methyltrimethoxysilane (component (B)), 48 parts of ion exchanged water, and 5.0 parts of zirconium (IV)tris-n-butoxydeethyl acetoacetate (component (C)) were added to the resulting reaction solution (the solution containing the component (A)). The mixture was subjected to a hydrolysis and condensation reaction while being stirred for 6 hours at 60° C. to prepare the composition (2) of the present invention.

Example 3

According to the formulations shown in Table 3, 100 parts of the copolymer (3) having a epoxy group prepared in Preparation Example 3, 33 parts of γ-mercaptopropyl-trimethoxysilane (reactive silane compound), 500 parts of methyl ethyl ketone, and 0.1 part of triethylamine were stirred for 12 hours at 60° C. under a nitrogen gas atmosphere to react the copolymer (3) with γ-mercaptopropyltrimethoxysilane to obtain the component (A).

133 parts of methyltrimethoxysilane (component (B)), 67 parts of colloidal silica dispersed in methyl ethyl ketone "MEK-ST" (manufactured by Nissan Chemical Industries, Ltd., 30% solid component), 24 parts of ion exchanged water, and 2.0 parts of titanium (IV) tris-i-propoxideethyl acetoacetate (component (C)) were added to the resulting reaction solution (the solution containing the component (A)). The mixture was subjected to a hydrolysis and condensation reaction while being stirred for 6 hours at 60° C. to prepare the composition (3) of the present invention.

Example 4

According to the formulations shown in Table 3, 100 parts of the copolymer (4) having a hydroxyl group prepared in Preparation Example 4, 17 parts of γ-aminopropyltriethoxysilane (reactive silane compound), and 1200 parts of methyl ethyl ketone were stirred for 12 hours at 60° C. under a nitrogen gas atmosphere to react the copolymer (4) with γ-aminopropyltriethoxysilane to obtain the component (A).

554 parts of methyltrimethoxysilane (component (B)), 110 parts of ion exchanged water, and 18 parts of aluminum tris (ethyl acetoacetate) (manufactured by Kawaken Fine Chemical Co., Ltd.) were added to the resulting reaction solution (the solution containing the component (A)). The mixture was subjected to a hydrolysis and condensation reaction while being stirred for 6 hours at 60° C. Then, 16 parts of acetylacetone was added before cooling to prepare the composition (4) of the present invention.

liquid mixtures were applied to the surfaces of transparent substrate made of polycarbonate (2 mm thickness) by a dipping method. The coatings were dried for 30 minutes at 100° C. using a hot-air circulation oven to form cured coatings with a thickness of 0.1 μm.

<Evaluation of Cured Coatings>

Pencil hardness, the refraction index, adhesion to a substrate, weatherability, transparency, and antireflection properties were measured for evaluation of each cured coating formed on the surface of transparent substrates. The results are shown in Table 4. The measurement and evaluation methods are as follows:

(1) Pencil hardness: Pencil hardness was measured according to JIS K5400.
(2) Refraction index: The refraction index was measured for the films with a thickness of 30 to 50 μm using an Abbe's refractometer (measurement temperature: 20° C.).
(3) Adhesion: Adhesion to a substrate was evaluated by a peeling test comprising peeling 100 pieces of 1 mm×1 mm cross-cuts formed on a substrate using adhesive tape and counting the number of 1 mm×1 mm squares remaining on the substrate. The case in which all 100

TABLE 3

| Example | | 1 | 2 | 3 | 4 | 5 |
|---|---|---|---|---|---|---|
| Composition of the present invention | | (1) | (2) | (3) | (4) | (5) |
| Reactive fluorine-containing copolymer | Copolymer (1) | 100 | — | — | — | — |
| | Copolymer (2) | — | 100 | — | — | — |
| | Copolymer (3) | — | — | 100 | — | — |
| | Copolymer (4) | — | — | — | 100 | — |
| | Copolymer (5) | — | — | — | — | 100 |
| Reactive silane compound | γ-triethoxysilyl isocyanate | 10 | 20 | — | — | — |
| | γ-mercaptopropyltrimethoxysilane | — | — | — | 33 | 10 |
| | γ-aminopropyltriethoxysilane | — | — | 17 | — | — |
| Dibuthyltin dilaurate | | 0.01 | 0.01 | — | — | — |
| Triethylamine | | — | — | 0.01 | — | 0.01 |
| Methyltrimethoxysilane (component (B)) | | 240 | 240 | 133 | 554 | 240 |
| Methyl ethyl ketone dispersed colloidal silica "MEK-ST" | | — | — | 67 | — | 40 |
| Ion exchanged water | | 48 | 48 | 24 | 110 | 48 |
| Aluminum tris (ethyl acetoacetate) (component (C)) | | 7.8 | — | — | 18 | — |
| Zirconium (IV) tris-n-butoxideethyl acetoacetate (component (C)) | | — | 5.0 | — | — | — |
| Titanium (IV) tris-I-propoxideethyl acetoacetate (componet (C)) | | — | — | 2.0 | — | 2.0 |
| Acetylaceton | | — | — | — | 6.01 | — |
| Methyl ethyl ketone | | 550 | 750 | 500 | 1200 | 750 |

Example 5

The composition (5) of the present invention was obtained in the same manner as in Example 1, except for using the components shown in Table 3.

Comparative Example 1

The composition (7) for comparison was prepared in the same manner as in Example 1 except that the component (C) was not used.

The composition (8) for comparison was prepared in the same manner as in Example 2 except that the component (C) was not used.

<Formation of Cured Coatings>

5 parts of a solution of octyltin trislaurate (10 wt % concentration) in xylene was added to 100 parts of the compositions (1)–(5) obtained in Examples 1–5 and the compositions (6)–(7) obtained in Comparative Examples 1–2 to prepare the coating liquid mixtures. The coating squares remained on the substrate was rated as "○", the case where 99 to 95 squares remained was rated as "Δ", and the case where 94 or less squares remained was rated as "X".

(4) Weatherability: An accelerated weathering test was carried out for each substrate on which the coating of the present invention was formed, using a fademeter (manufactured by Suga Test Industries Co., Ltd.), to measure a gloss retention rate (%) after 1000 hours. The case where the gloss retention rate was 90% or more was rated as "○", the case where the gloss retention rate was 89 to 60% was rated as "Δ", and the case where the luster retention rate was 59% or less was rated as "X".

(5) Transparency: The case where the coating formed on the surface of a substrate was entirely transparent was rated as "○", the case where opaqueness was observed on the coating was rated as "X".

(6) Antireflection properties: The coating (0.12 μm thickness) was formed on part of the surface of a polycarbonate substrate (4 mm thickness). The antireflection effects were observed with the naked eye for both the coated part and the uncoated part. The case where a sufficient antireflection effect for the coating was recognized was rated as "○", the case where no significant difference in the antireflection effect was recognized between the two parts was rated as "X".

<Evaluation of Storage Stability of the Composition>

Storage stability of the composition was evaluated by the following method for the compositions (1)–(5) obtained in Examples 1–5 and the compositions (6)–(7) obtained in Comparative Examples 1–2. The results are shown in Table 4.

(Evaluation Method)

After a 3% solution of the composition was stored for 2 months at 40° C. in a glass container, the solution was observed with the naked eye to examine whether an abnormal phenomenon such as condensates or coloration appeared. The case where no abnormal phenomena were observed was rated as "○", the case where any abnormal phenomena were observed was rated as "X".

TABLE 4

| Coating composition | Composition of the present invention | | | | | Comparative composition | |
|---|---|---|---|---|---|---|---|
| | (1) | (2) | (3) | (4) | (5) | (6) | (7) |
| Pencil hardness | H | H | H | H | H | HB | HB |
| Refractive index | 1.39 | 1.39 | 1.39 | 1.40 | 1.39 | — | — |
| Adhesion | ○ | ○ | ○ | ○ | ○ | Δ | Δ |
| Weatherability | ○ | ○ | ○ | ○ | ○ | — | — |
| Transparency | ○ | ○ | ○ | ○ | ○ | X | X |
| Antireflection properties | ○ | ○ | ○ | ○ | ○ | X | X |
| Storage stability | ○ | ○ | ○ | ○ | ○ | X | X |

Note: Refractive index and weatherability of the compositions (6) and (7) were not evaluated because the coatings whitened.

<Ease of Removing Stains>

A cured coating was prepared using the composition obtained in the Example 5. Stains were produced on the coating with oily black ink and dried. Ink was easily removed by wiping the stains with dry cloth.

A transparent cured coating according to the composition of the present invention excels in adhesion to various substrates made of glass, ceramic, metal, plastic and the like, and in scratch resistance, weatherability, and antireflection properties. This coating exhibits a low refraction index, and can be formed efficiently.

The composition of the present invention is suitably used as an external paint, hard coating material, desiccating coating, antireflection coating material, stain-proof coating material, and particularly as a coating material for optical parts used for coating a transparent substrate made of glass, plastic and the like.

Obviously, numerous modifications and variations of the present invention are possible in light of the above teachings. It is therefore to be understood that within the scope of the appended claims, the invention may be practiced otherwise than as specifically described herein.

What is claimed is:

1. A coating composition comprising:

(A) a fluorine-containing polymer obtained from a monomer selected from the group consisting of a fluoroolefin, a fluorine-containing vinyl ether, a flourine-containing (meth)acrylate and mixtures thereof, wherein said monomer also contains a hydrolyzable silyl group, (B) a compound represented by the following general formula (1) or a partial condensation product thereof, $$SiR^1_n(OR^2)_{4-n} \quad (1)$$

wherein $R^1$ represents an alkyl group, an aryl group, an aralkyl group, a group containing —SH, or a group containing —NCO, each containing 1 to 10 carbon atoms, $R^2$ represents a hydrogen atom, an alkyl group or acyl group having 1 to 10 carbon atoms, and n is an integer from 0 to 3, provided that when two or more groups represented by $R^1$ and $R^2$ are present, these groups may be either the same or different and at least one group represented by $R^2$ must be an allyl group or acyl group, and (C) a chelate complex derived from a metal alkoxide.

2. The composition according to claim 1, wherein the compound represented by the above general formula (1) is tetraalkoxysilane or trialkoxysilane or both.

3. The composition according to claim 1, wherein the metal of the metal alkoxide is selected from the group consisting of titanium, aluminum, and zirconium.

4. The composition according to claim 1, wherein the chelate complex derived from the metal alkoxide is represented by the following general formula:

$$M(OR^5)_{p+q} + q \cdot R^6COCH_2COR^7 \rightarrow M(OR^5)_p(R^6COCHCOR^7)_q + qHOR^q$$

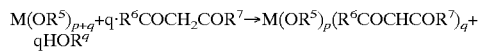

wherein M represents aluminum, titanium, or zirconium, $R^5$ is a hydrogen atom, an alkyl group or acyl group having 1–10 carbon atoms, $R^6$ is an alkyl group having 1–6 carbon atoms, $R^7$ represents an alkyl group or acyl group having 1–16 carbon atoms, p is an integer from 0 to 3, and q is an integer from 1 to 4, provided that two or more groups ($OR^5$) or ($R^6COCHCOR^7$) which may be present may be either the same or different.

5. The composition according to claim 1, comprising the component (A) and component (B) at a proportion of 3:97 to 95:5.

6. The composition according to claim 1, comprising the component (C) in an amount from 0.0001 to 0.01 mol % for the total mols of alkoxy groups in the components (A) and (B).

7. A coating formed by coating and heating the composition of claim 1.

8. The composition of claim 1, wherein component (A) and component (B) are bonded as a result of hydrolysis and condensation or a polycondensation reaction.

* * * * *